United States Patent [19]

Kawamura

[11] Patent Number: 5,072,700

[45] Date of Patent: Dec. 17, 1991

[54] ELECTROMAGNETIC VALVE CONTROL SYSTEM

[75] Inventor: Hideo Kawamura, Samukawa, Japan

[73] Assignee: Isuzu Ceramics Research Institute Co., Ltd., Kanagawa, Japan

[21] Appl. No.: 626,021

[22] Filed: Dec. 12, 1990

[30] Foreign Application Priority Data

Dec. 12, 1989 [JP] Japan ................. 1-322423

[51] Int. Cl.$^5$ ............................................. F01L 9/04
[52] U.S. Cl. ........................ 123/90.11; 123/315; 251/129.01
[58] Field of Search ............. 123/90.11, 90.15, 315; 251/129.01, 129.05, 129.09

[56] References Cited

U.S. PATENT DOCUMENTS

| | | | |
|---|---|---|---|
| 4,194,472 | 3/1980 | Amano et al. | 123/315 |
| 4,544,986 | 10/1985 | Buchl | 123/90.11 |
| 4,651,684 | 3/1987 | Masuda et al. | 123/315 |
| 4,779,589 | 10/1988 | Matsuura et al. | 123/315 |
| 4,829,947 | 5/1989 | Le Quesne | 123/90.11 |
| 4,841,923 | 6/1989 | Buchl | 123/90.11 |
| 4,964,375 | 10/1990 | Takeyama et al. | 123/315 |

Primary Examiner—E. Rollins Cross
Assistant Examiner—Weilun Lo
Attorney, Agent, or Firm—Staas & Halsey

[57] ABSTRACT

An electromagnetic valve control system electromagnetically opens and closes intake and exhaust valves in an engine having a crankshaft. The electromagnetic valve control system has a valve actuator for opening an intake valve, a valve actuator for opening an exhaust valve, and a valve actuator for opening an auxiliary exhaust valve before the exhaust valve is opened. The electromagnetic valve control system also has valve operation detectors for detecting actual operating conditions of the intake valve, the exhaust valve, and the auxiliary exhaust valve, a rotation detector for detecting the rotational speed of the engine and the angle of the crankshaft, a load detector for detecting the load on the engine, a controller for applying actuating signals to the intake, exhaust, and auxiliary exhaust valve actuating means in synchronism with a crankshaft angle signal from the rotation detecting means, based on the detected rotational speed and load, and for correcting the actuating signals based on detected signals from the valve operation detecting means.

3 Claims, 4 Drawing Sheets

ELECTROMAGNETIC VALVE CONTROL SYSTEM

BACKGROUND OF THE INVENTION

1. Field of the Invention

The present invention relates to an electromagnetic valve control system for controlling the opening and closing intake and exhaust valves which are electromagnetically actuated and also the opening and closing of an auxiliary exhaust valve associated with the exhaust valve.

2. Description of Prior Art

Intake and exhaust valves of some conventional engines are opened and closed by a camshaft. The camshaft is operatively connected to the crankshaft of the engine, so that the timing of opening and closing the intake and exhaust valves with respect to the angle of the crankshaft cannot be varied as the rotational speed of the engine varies. Since the timing of opening and closing the intake and exhaust valves is adjusted in advance to achieve a high engine efficiency at a particular engine rotational speed, the engine efficiency is lowered when the engine rotates at speeds other than the particular engine rotational speed.

Japanese Laid-Open Patent Publication No. 58(1983)-18380 discloses an internal combustion engine valve mechanism which includes a detector for detecting an operating condition of an internal combustion engine, and electric actuators for opening and closing intake and exhaust valves based on a detected signal from the detector.

Japanese Laid-Open Patent Publication No. 61(1986)-76713 also discloses an engine valve control system having an electric actuator for opening and closing an intake or exhaust valve, and a control unit for applying a pulse to the electric actuator to open the valve immediately before the valve is seated from an open position into a closed position, so that shocks imposed on the valve when it is seated are reduced.

The intake and exhaust valves themselves can be opened and closed under relatively small forces by the electric actuators such as electromagnets. When the exhaust valve is to be opened while the engine is in operation, however, a large force is required to be applied to the exhaust valve since the exhaust valve has to be moved against the pressure developed in the combustion chamber. Therefore, the electromagnet for actuating the exhaust valve is large in size, or the exhaust valve may not be opened due to the lack of a sufficient valve actuating force.

For example, if it is assumed that the pressure in the combustion chamber in the expansion stroke is 5 Kg/cm² and the surface area of the exhaust valve which faces the combustion chamber is 8 cm², then the electromagnetic force required to open the exhaust valve against the pressure in the combustion chamber is 40 Kg (392N). As the exhaust valve is also required to be accelerated when it is opened, the electromagnetic force of about 80 Kg (784N) must be generated by the electromagnet.

The stroke by which the intake and exhaust valves are opened and closed is difficult or impossible to change in the engines as disclosed in the above publications. Therefore, the opening and closing of the intake and exhaust valves cannot be controlled depending on the rotational speed and load of the engine, and hence do not match the actual operating condition of the engine sometimes.

SUMMARY OF THE INVENTION

According to the present invention, there is provided an electromagnetic valve control system for electromagnetically opening and closing intake and exhaust valves in an engine having a crankshaft, comprising intake valve actuating means for opening an intake valve, exhaust valve actuating means for opening an exhaust valve, auxiliary exhaust valve actuating means for opening an auxiliary exhaust valve before the exhaust valve is opened, valve operation detecting means for detecting actual operating conditions of the intake valve, the exhaust valve, and the auxiliary exhaust valve, rotation detecting means for detecting the rotational speed of the engine and the angle of the crankshaft, load detecting means for detecting the load on the engine, means for applying actuating signals to the intake, exhaust, and auxiliary exhaust valve actuating means in synchronism with a crankshaft angle signal from the rotation detecting means, based on the detected rotational speed and load, and signal correcting means for correcting the actuating signals based on detected signals from the valve operation detecting means.

The auxiliary exhaust valve is opened prior to the opening of the exhaust valve thereby to lower the pressure in a combustion chamber of the engine, for thereby reducing forces required to open the exhaust valve. The actual operating conditions of the intake valve, the exhaust valve, and the auxiliary exhaust valve are detected and compared with desired operating conditions. If the detected actual operating conditions are different from the desired operating conditions, the actual detected operating conditions are corrected. The exhaust valves are reliably actuated to discharge exhaust gases with the electromagnetic valve actuators which are small in size. The opening and closing of the intake and exhaust valves are appropriately controlled depending on the rotational speed of the engine and the load on the engine.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
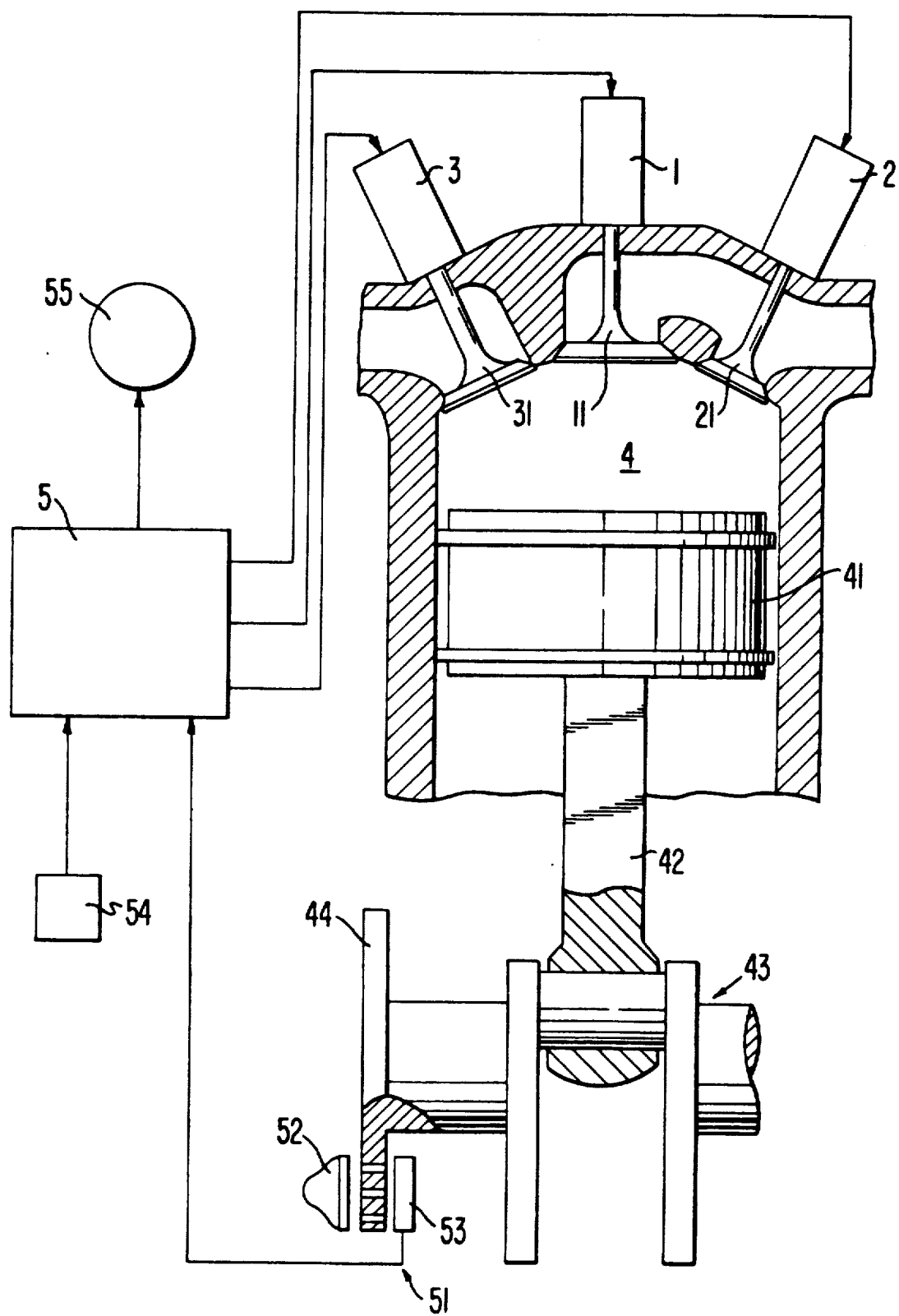
FIG. 1 is a cross-sectional view, partly in block form, of an engine incorporating an electromagnetic valve control system according to the present invention.

FIG. 1 shows an internal combustion engine which incorporates an electromagnetic valve control system according to the present invention.

The engine has a main exhaust valve 11 made of a lightweight high-hardness material such as a ceramic material or a heat-resistant lightweight alloy material. The main exhaust valve 11 has an axial end connected to a valve actuator 1 for opening and closing the main exhaust valve 11.

The engine also has an auxiliary exhaust valve 21 and an intake valve 31 which are disposed adjacent to the main exhaust valve 11. The auxiliary exhaust valve 21 has a surface area facing a combustion chamber 4, the surface area being smaller than the surface area of the main exhaust valve 21 which also faces the combustion chamber 4. Each of the auxiliary exhaust valve 21 and the intake valve 31 is also made of a lightweight high-hardness material such as a ceramic material or a heat-resistant lightweight alloy material. The auxiliary exhaust valve 21 and the intake valve 31 have respective axial ends connected to respective valve actuators 2, 3 for opening and closing the auxiliary exhaust valve 21 and the intake valve 31, respectively.

The main exhaust valve 11, the auxiliary exhaust valve 21, and the intake valve 31 face the combustion chamber 4 which is partly defined by a piston 41 disposed therebelow. The piston 41 is coupled to the pin journal of a crankshaft 43 through a connecting rod 42.

The crankshaft 43 has a flange 44 which has a plurality of circumferential slits defined therein. The slits in the flange 44 are sandwiched by a crankshaft angle sensor 51. The crankshaft angle sensor 51 comprises a light-emitting element 52 disposed on one side of the flange 44 and a light-detecting element 53 for detecting a ray of light which is emitted by the light-emitting element 52 and passing through the slits in the flange 44. The crankshaft angle sensor 51 is a sensor for detecting the rotational speed and angle of the crankshaft 43. An accelerator pedal movement sensor 54 detects the amount of depression of an accelerator pedal which corresponds to the load on the engine.

A fuel injector 55 injects fuel into the combustion chamber 4. The timing and rate at which the fuel is injected by the fuel injector 55 can be varied by an external signal applied to the fuel injector 55.

The crankshaft angle sensor 51, the accelerator pedal movement sensor 54, the fuel injector 55, and the valve actuators 1, 2, 3 are electrically connected to an input/output interface of a controller 5. The input/output interface receives signals from the crankshaft angle sensor 51 and the accelerator pedal movement sensor 54, and applies control signals to the fuel injector 55 and the valve actuators 1, 2, 3. The controller 5 also has a ROM for storing a control program and various data maps, a CPU for carrying out arithmetic operations according to the program stored in the ROM, a RAM for temporarily storing data and the results of arithmetic operations, and a control memory for controlling the flow of signals in the controller 5.

The valve actuators 1, 2 will now be described below. The valve actuator 3 is identical in construction to the valve actuator 1, and hence will not be described.

Figure 2:
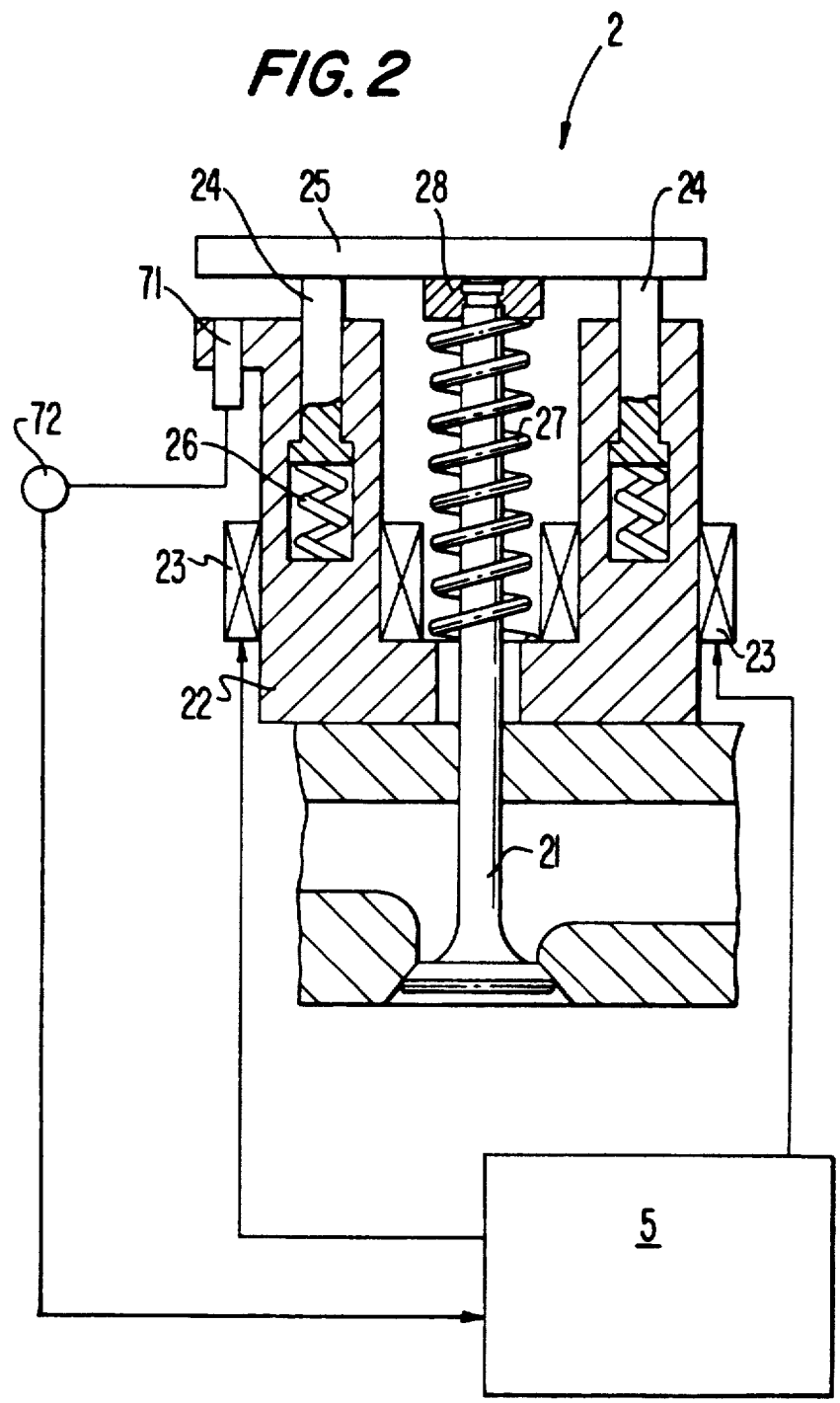
FIG. 2 is a cross-sectional view, partly in block form, of a valve actuator in the electromagnetic valve control system.

FIG. 2 shows the valve actuator 2 in detail. The valve actuator 2 has a core 22 made of a magnetic material and having fixed magnetic poles positioned slightly below the upper end of the auxiliary exhaust valve 21 as it is closed. The fixed magnetic poles of the core 22 can be magnetized by an exciting coil 23. A magnetic plate 25 is slidably supported on the fixed magnetic poles by guide bars 24 of a nonmagnetic material. The guide bars 24 are normally urged to move upwardly as viewed in FIG. 2. When the magnetic plate 25 is in its upper limit position, it is slightly spaced from or held in contact with a stopper 28 mounted on the upper end of the auxiliary exhaust valve 21. The auxiliary exhaust valve 21 is normally urged to move upwardly under the bias of a spring 27 disposed under compression between the stopper 28 and the core 22.

A valve operation sensor 71 for detecting an operating condition of the auxiliary exhaust valve 21 is electrically connected to a photoelectric switch 72 through two optical fibers. The photoelectric switch 72 comprises a light-emitting diode (LED) and a phototransistor. A ray of light emitted from the light-emitting diode is transmitted through one of the optical fibers and applied from the valve operation sensor 71 to a lower surface of the magnetic plate 25. When the magnetic plate 25 is lowered to a predetermined position, a ray of light reflected from the lower surface of the magnetic plate 25 enters the valve operation sensor 71 and is transmitted through the other optical fiber to the phototransistor of the photoelectric switch 72. A signal which detects when the magnetic plate 25 is lowered to the predetermined position is applied from the photoelectric switch 72 to the controller 5.

Figure 3:
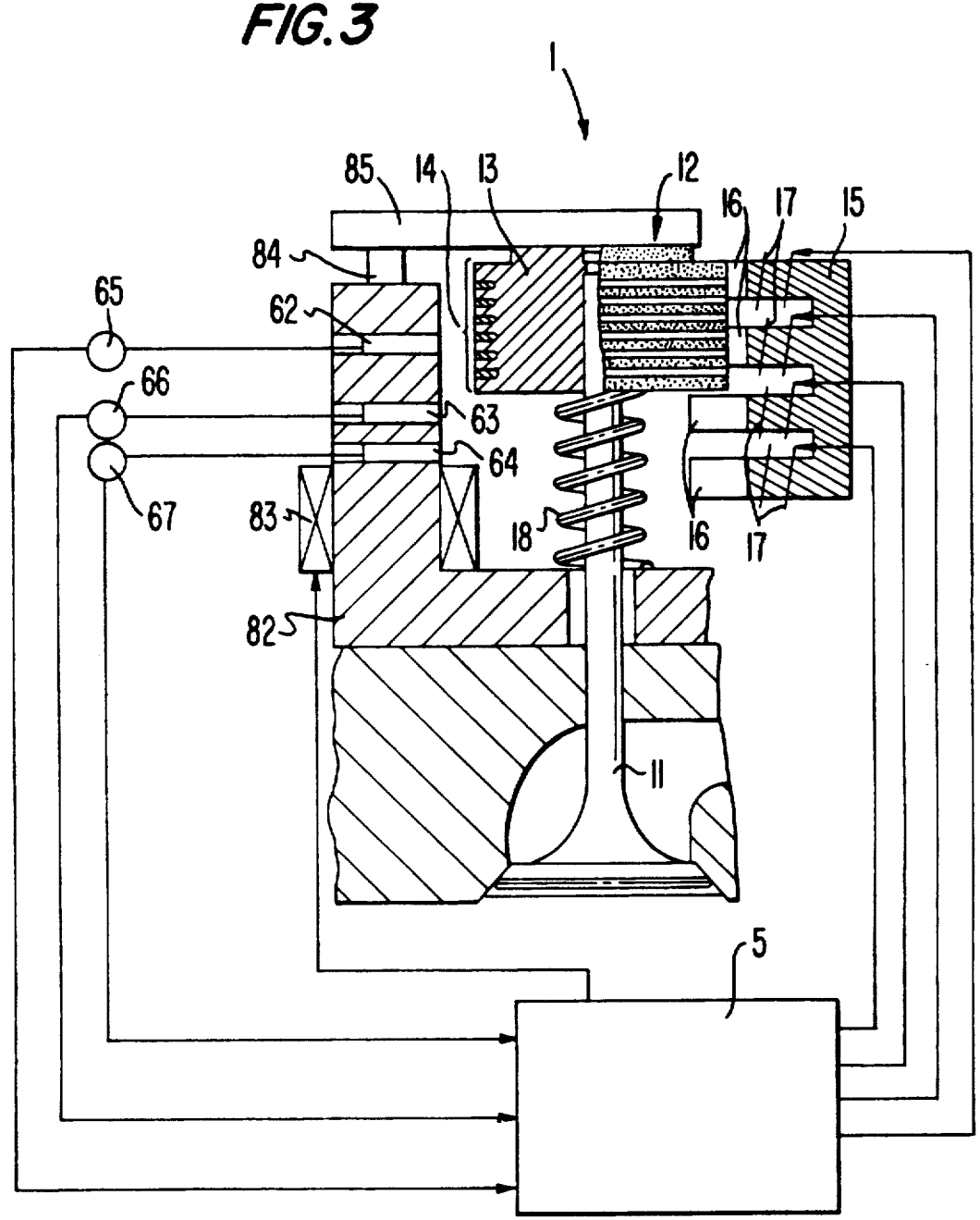
FIG. 3 is a cross-sectional view, partly in block form, of another valve actuator in the electromagnetic control system.

FIG. 3 shows the valve actuator 1 in detail. The valve actuator 1 comprises a movable member 12 mounted on an axial end of the main exhaust valve 11. The movable member 12 comprises a cylindrical magnetic path element 13 and a plurality of secondary coils 14 extending around the outer circumference of the magnetic path element 13. The secondary coils 14 are produced by pouring melted aluminum into grooves defined in the outer circumference of the magnetic path element 13. Therefore, the secondary coils 14 and side surfaces of the magnetic path element 13 lying between the secondary coils 14 have different light reflectivities.

The magnetic path element 13 is made of a magnetic material for increasing the flux density to act on the secondary coils 14. For example, the magnetic path element 13 comprises thin radial plates of a magnetic amorphous metallic material which are combined into a cylindrical shape. The magnetic path element 13 defines a magnetic path for the passage of magnetic fluxes from fixed magnetic poles 16.

The movable member 12 is normally urged by a spring 18 in a direction to close the main exhaust valve 11 in order to prevent the main exhaust valve 11 from dropping into the combustion chamber 4 while the engine is not operating.

A pair of actuator units 15 is disposed alongside of the movable member 12, one on each side thereof. Each of the actuator units 15 comprises fixed magnetic poles 16 disposed in confronting relation to the secondary coils 14, and exciting coils 17 wound around the respective fixed magnetic poles 16. The exciting coils 17 are supplied with alternating currents from the controller 5 to produce a traveling magnetic field which acts on the secondary coils 14 of the movable member 12.

Above the movable member 12, there is disposed a magnetic plate 85 which is slightly spaced from or held in contact with the movable member 12 when the main exhaust valve 11 is seated.

A core 82 is also disposed alongside of the movable member 12 and has a pair of fixed magnetic poles positioned one on each side of the main exhaust valve 11. The magnetic plate 85 is slidably supported on the fixed magnetic poles of the core 82 through guide bars 84. The fixed magnetic poles of the core 82 are positioned downwardly of the upper end surface of the movable member 12 when the main exhaust valve 11 is closed. The fixed magnetic poles can be magnetized by lower coils 83 disposed therearound, to attract the magnetic plate 85 against the upper end surface of the movable member 12 for thereby driving the movable member 12 downwardly. The magnetic plate 85 is normally urged to move upwardly by springs (not shown).

The core 82 also has three probes 62, 63, 64 embedded therein in confronting relation to an outer side of the movable member 12. The probes 62, 63, 64 are juxtaposed in the direction in which the movable member 12 is movable. The probe 62 is positioned in confronting relation to a side position on the movable member 12, which corresponds to a seated position in which the main exhaust valve 11 is seated. The probe 63 is positioned in confronting relation to a side position on the movable member 12, which corresponds to a decelerated position on the moving stroke of the main exhaust valve 11. The probe 64 is positioned in confronting relation to a side position on the movable member 12, which corresponds to a stopped position in which the main exhaust valve 11 is fully opened.

The probes 62, 63, 64 are connected to respective photoelectric switches 65, 66, 67 each through two optical fibers. Each of the photoelectric switches 65, 66, 67 comprises a light-emitting diode (LED) and a phototransistor. A ray of light emitted from the light-emitting diode is transmitted through one of the optical fibers and applied from the probe to an outer side of the movable member 12. A ray of light reflected from the outer side of the movable member 12 enters the probe and is transmitted through the other optical fiber to the phototransistor of the photoelectric switch. The photoelectric switch produces an output signal when the reflectivity of the outer side of the movable member 12, to which the ray of light is applied, is in excess of a predetermined value. Output signals from the photoelectric switches 65, 66, 67 are transmitted to the controller 5.

Figure 4:
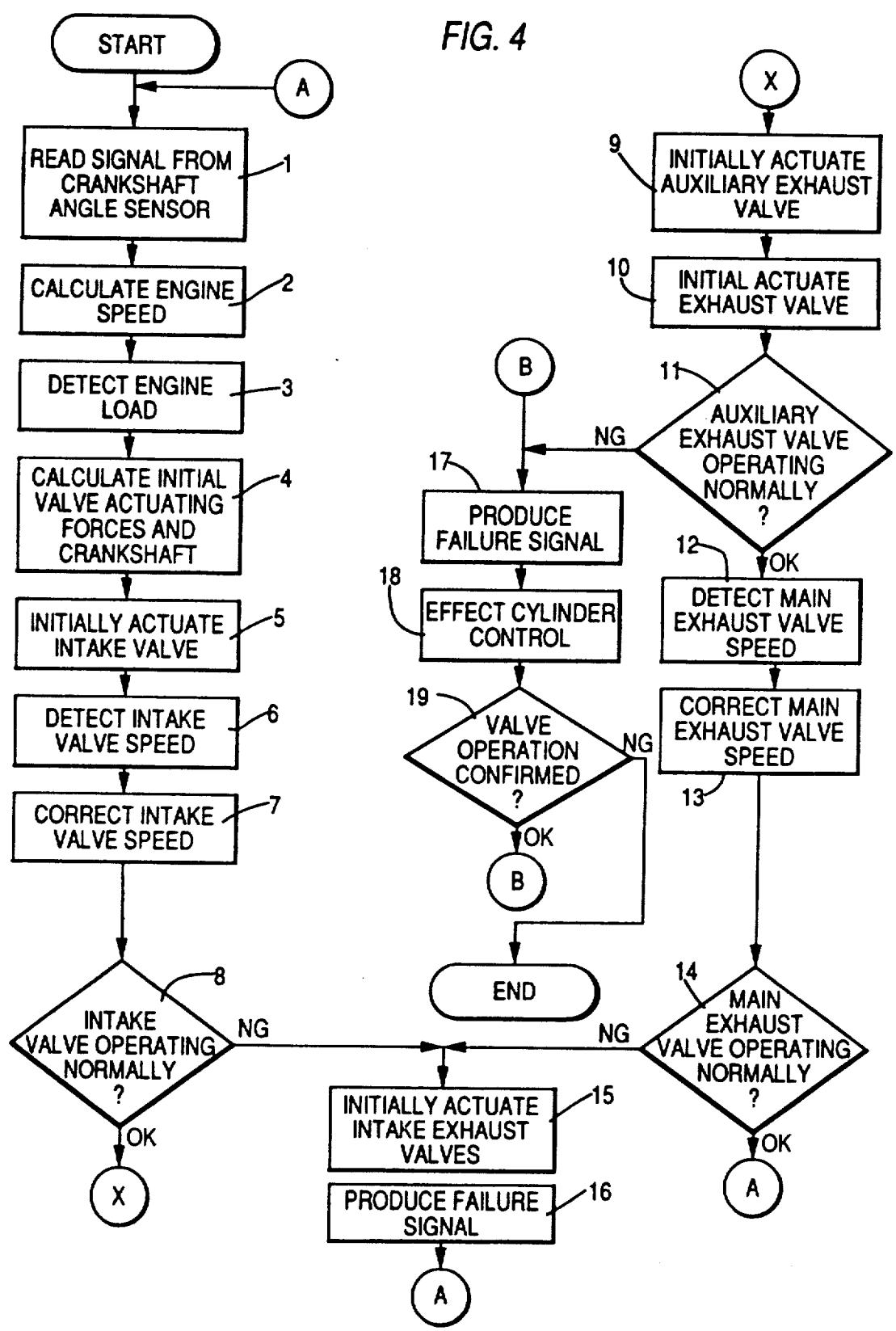
FIG. 4 is a flowchart of an operation sequence of the electromagnetic valve control system.

A control process of the electromagnetic valve control system according to the present invention will now be described below with reference to the flowchart of FIG. 4.

An output signal from the crankshaft angle sensor 51 is read in a step 1, and the rotational speed of the crankshaft 43 is calculated based on the read signal from the crankshaft angle sensor 51 in a step 2. In a step 3, an output signal from the accelerator pedal movement sensor 54 to detect the load on the engine.

From the rotational speed and the engine load, there are calculated initial forces for actuating the main exhaust valve 11, the auxiliary exhaust valve 21, and the intake valve 31, and crankshaft angles corresponding to timings to start opening these valves, in a step 4.

Based on the calculated forces and crankshaft angles, the magnetic plate which confronts the upper end of the intake valve 31 is attracted to initially drive the intake valve 31 in a step 5.

The speed at which the initially actuated intake valve 31 moves is detected by the three probes and the photoelectric switches in the valve actuator 3 in a step 6. The detected speed is then corrected to meet a predetermined operating condition in a step 7.

A step 8 determines whether the intake valve 81 effects a predetermined operation or not. If the intake valve 31 operates normally, then control goes to a step 9, and if the intake valve 31 malfunctions, control jumps to a step 15.

In the step 9, the exiting coil 23 is energized at the timing to start discharging exhaust gases, to attract the magnetic plate 25 for thereby initially actuating the auxiliary exhaust valve 21.

At the timing to start discharging exhaust gases, the pressure P in the combustion chamber 4 is about 5 $Kg/cm^2$. If the surface area of the auxiliary exhaust valve 21 which faces the combustion chamber 4 is 2 $cm^2$, then the electromagnetic force required to open the auxiliary exhaust valve 21 against the pressure in the combustion chamber 4 is only 10 Kg (98N). The accelerating force for the auxiliary exhaust valve 21 when it is opened may be smaller than the accelerating force for the main exhaust valve 11.

More specifically, the auxiliary exhaust valve 21 is first opened to lower the pressure in the combustion chamber 4, and thereafter the main exhaust valve 11 is opened. The valve actuator 1 produces electromagnetic forces required to accelerate the main exhaust valve 11.

The core 82 is magnetized to initially actuate the main exhaust valve 11 in a step 10.

A step 11 determines whether or not the auxiliary exhaust valve 21 operates normally based on the signal from the photoelectric switch 72. If the auxiliary exhaust valve 21 operates normally, control goes to a step 12, and if not, control goes to a step 17.

In the step 12, the speed at which the main exhaust valve 11 moves is detected based on the signals from the photoelectric switches 65, 66, 67. The detected speed is then corrected to meet a predetermined operating condition in a step 13.

A step 14 determines whether the main exhaust valve 11 operates normally or not. If it operates normally, then control goes back to the step 1, and if not, then control goes to the step 15.

In the step 15, since the speed of travel of at least one of the intake valve 31 and the main exhaust valve 11 cannot be corrected, the valves are only initially actuated by attracting the magnetic plates. Then, a failure signal is produced in a step 16.

In the step 17, a failure signal is produced. Then, engine cylinder control is carried out in a step 18. According to the engine cylinder control, the engine cylinder which has the malfunctioning auxiliary exhaust valve 21 is disabled. For example, if the engine has four cylinders, and the first or fourth cylinder malfunctions, then the valves of the first and fourth cylinders are inactivated and the supply of fuel to these cylinders is cut of, and the engine is operated with only the second and third cylinders. If the second or third cylinders malfunction, then the engine is operated with only the first and fourth cylinders.

The operation of the valves is confirmed in a step 19 after the engine cylinder control. If a further cylinder failure is detected, then it is determined that the engine cannot be operated, and the valve control process is brought to an end. If the engine cylinder control is effected normally, then control goes back to the step 17, and the failure signal is continuously produced and the engine cylinder control is continued.

Although a certain preferred embodiment has been shown and described, it should be understood that many changes and modifications may be made therein without departing from the scope of the appended claims.

I claim:

1. An electromagnetic valve control system for electromagnetically opening and closing intake and exhaust valves in an engine having a crankshaft, comprising:
   intake valve actuating means for opening an intake valve;
   exhaust valve actuating means for opening an exhaust valve;
   auxiliary exhaust valve actuating means for opening an auxiliary exhaust valve before said exhaust valve is opened;
   valve operation detecting means for detecting actual operating conditions of the intake valve, the exhaust valve, and the auxiliary exhaust valve;
   rotation detecting means for detecting the rotational speed of the engine and the angle of the crankshaft;
   load detecting means for detecting the load on the engine;
   means for applying actuating signals to said intake, exhaust, and auxiliary exhaust valve actuating means in synchronism with a crankshaft angle signal from said rotation detecting means, based on the detected rotational speed and load; and
   signal correcting means for correcting said actuating signals based on detected signals from said valve operation detecting means.

2. An electromagnetic valve control system according to claim 1, further including valve operation determining means for determining operating conditions for the intake valve, the exhaust valve, and the auxiliary exhaust valve, and warning means for producing a warning signal when the actual operating conditions detected by said valve operation detecting means differ from the operating conditions determined by said valve operation determining means.

3. An electromagnetic valve control system according to claim 1, wherein said engine has a combustion chamber, said auxiliary exhaust valve having a surface area facing said combustion chamber and smaller than the surface area of the exhaust valve which faces the combustion chamber.

* * * * *

UNITED STATES PATENT AND TRADEMARK OFFICE
CERTIFICATE OF CORRECTION

PATENT NO. : 5,072,700

DATED : December 17, 1991

INVENTOR(S) : Kawamura

It is certified that error appears in the above-identified patent and that said Letters Patent is hereby corrected as shown below:

Column 6, line 51, "of," should be --off, --.

Signed and Sealed this

First Day of June, 1993

Attest:

MICHAEL K. KIRK

*Attesting Officer*   Acting Commissioner of Patents and Trademarks